Aug. 29, 1961 L. I. SPEAR 2,997,918
CONTACT LENS HOLDER
Filed Aug. 20, 1959
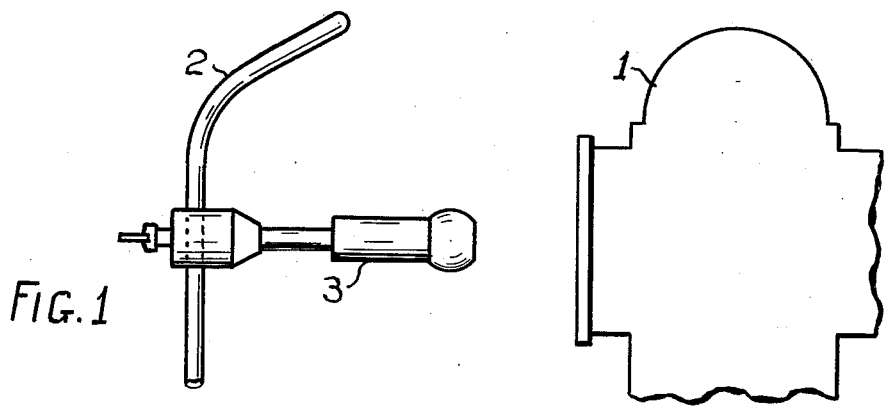
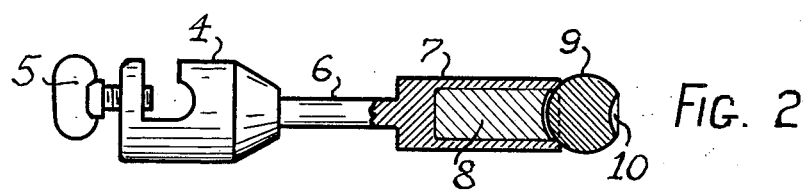
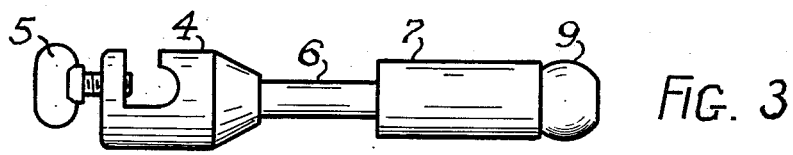
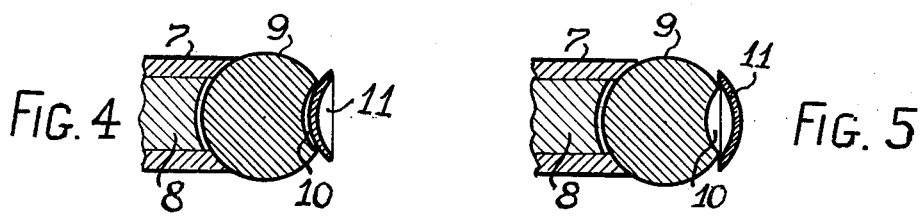
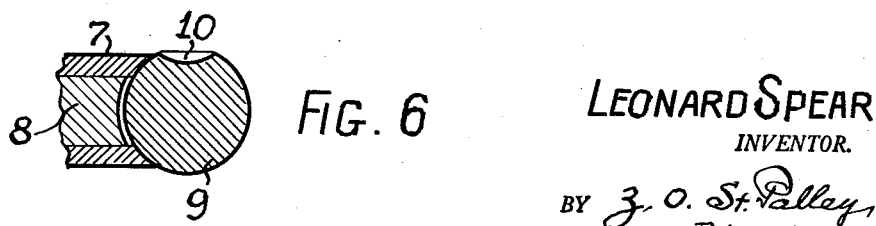
LEONARD SPEAR
*INVENTOR.*

United States Patent Office 2,997,918
Patented Aug. 29, 1961

1

2,997,918
CONTACT LENS HOLDER
Leonard I. Spear, 19 S. Main St., Branford, Conn.
Filed Aug. 20, 1959, Ser. No. 835,065
4 Claims. (Cl. 88—56)

My invention relates to contact lens holders, and more particularly to magnetic holders utilized in the measuring of the curvatures of contact lenses.

In the art of optometry the measuring of the curvatures of the cornea is an essential operation for the prescription of the visual correction. Therefore, in the practice of optometry the curvature measuring instruments, known as ophthalmometers and keratometers, are indispensable, and generally available.

The principal object of my invention is to provide a contact lens holder which will adapt the customary, and generally available, curvature measuring instruments, known as ophthalmometers and keratometers, to measure the curvatures of the contact lenses and thereby eliminate the necessity of the purchase of an expensive special instrument for this purpose.

Another important object of my invention is to provide a contact lens holder which, when cooperating with a curvature measuring instrument, known as ophthalmometer or keratometer, can function as a precision gauge, permitting the operator to check and correct the accuracy of the said ophthalmometer or keratometer and thereby enhance the accuracy of the curvature measurement of the contact lens.

A further object of my invention is to provide a contact lens holder for cooperation with the customary curvature measuring instruments, which is convenient and efficient in use and economical in first cost.

Other objects and advantages of my invention will be apparent during the course of the following description.

In the accompanying drawing, forming a part of this application, wherein for the purpose of illustration is shown a preferred form of my invention, FIGURE 1 is a side view of my contact lens holder as mounted on a customary curvature measuring instrument, FIGURE 2 is a sectional view of my contact lens holder, FIGURE 3 is a side view of the same, FIGURE 4 is a sectional view showing the contact lens mounted on the ball for measuring the inside curvature of the lens, FIGURE 5 is a sectional view showing the contact lens mounted on the ball for measuring the outside curvature of the lens, FIGURE 6 is a sectional view showing the position of the ball when checking the accuracy of the curvature measuring instrument known as ophthalmometer and keratometer.

Referring to FIG. 1 of the drawing, the numeral 1 designates the customary curvature measuring instrument, known as ophthalmometer or keratometer, generally used in the art of optometry for the determination of the curvatures of the cornea of the eye. The function of these instruments is generally based on the projection of a ray of light to the point examined and the measurement of the angle of the reflected light ray. For the proper positioning of the eye with respect to the light ray projected by the instrument various guards are provided to steady the head of the patient, such as the guard 2 shown in FIG. 1. My invention, represented by the numeral 3 in FIG. 1, is so constructed that it can be conveniently secured to the guard 2 for the measuring of the curvatures of contact lenses, and it may be just as conveniently detached from the guard 2 thereby making the ophthalmometer or keratometer readily available for its original function.

The constructional details of a preferred form of invention are illustrated in FIGS. 2 and 3 of the drawing. An essential element of my contact lens holder is a clamping device which, in the preferred form illustrated consists of the clamp 4 and the cooperating screw 5. In alternative forms of my invention this clamping device may have different construction to suit the shape and size of the particular part of the ophthalmometer or keratometer to which my contact lens holder will be attached.

Connected to the clamp 4, by means of the stem 6, is the sleeve 7, enclosing a permanent magnet 8. The free end of this sleeve 7 and magnet 8 is concave to accommodate a steel ball 9 held by the magnet 8 and resting on the edge of the sleeve 7. The magnet 8 is so selected that it has sufficient attraction to hold the steel ball 9 safely in position at the free end of the sleeve 7 and it will also permit the rotation or the removal of the steel ball 9 without effort, thereby forming a very conveniently adjustable connection between the ball 9 and the sleeve 7, which is an important feature of the present invention. Another important advantage of this magnetic coupling is that it can accommodate balls of widely varying sizes which permits the employment of balls having a range of predetermined diameters for attaining better accuracy in the measurements. Ball 9 may be of other magnetic material than steel.

The steel ball 9 has a polished, light reflecting, surface except at one point the spherical surface is interrupted by a cavity 10 having blackened, non-reflective, surface. This cavity 10 has preferably a circular outline of smaller size than the overall diameter of the contact lens to be tested.

The function of the steel ball 9 is twofold. Its primary function is to carry and position the contact lens 11 during the curvature measuring operation, as illustrated in FIGS. 4 and 5. FIG. 4 shows the contact lens 11 mounted on the ball 9 when measuring the concave surface of the lens, while FIG. 5 shows the mounting of the lens for the measurement of the curvature of the convex surface of the lens 11. In the first case the contact lens 11 rests on the circular edge of the cavity 10. In the second case the lens 11 covers and overlaps the cavity 10, which is smaller in diameter than the lens. In both cases the lens 11 is secured to the ball 9 by the interposition of viscous fluid or paste, and the non-reflective quality of the surface of the cavity 10 plays an important part in the accuracy of the measurements. As a result of the magnetic coupling utilized in my invention, the ball 9 can be readily removed from the holder for the mounting of the contact lens and, after the mounting is accomplished, it can be just as readily replaced into the holder and angularly positioned by the easy rotation of the ball.

The second important function of the ball 9 is to serve as a precision gauge for the calibration of the ophthalmometer or keratometer, which operation usually precedes the taking of the curvature measurements of the contact lenses. Experience shows that, in order to attain the required accuracy in the curvature measurements of the contact lenses it is necessary to check and correct the calibration of the customary ophthalmometers and keratometers, particularly in the vicinity of the curvature reading of the lens tested. With my invention this is accomplished by the employment of a steel ball 9 the radius of which is accurately known and is not very different from the radii of curvature of the contact lens tested. For the calibration this steel ball is so mounted in the holder that the polished, light reflecting side of the ball surface will receive the ray of light projected from the curvature measuring instrument, as illustrated in FIG. 6. After the calibration is completed the same ball 9 is utilized for the mounting of the contact lens for the curvature measuring operations, as illustrated in FIGS. 4 and 5.

For greater accuracy and convenience the preferred form of my contact lens holder will be provided with several steel balls 9 of different diameters corresponding to the range of curvatures encountered in contact lenses.

The operation of my invention is as follows:

My contact lens holder is secured to the ophthalmometer or keratometer and is positioned so as to have the free end of the sleeve 7 in line with the projected light ray of the instrument. Then, a steel ball 9 is selected with a known radius approximating the specified radii of curvature of the contact lens to be tested, and this ball is mounted on the holder in accordance with FIG. 6. By projecting a light ray on the polished side of the ball and measuring the angle of the reflection the ophthalmometer or keratometer is calibrated. Following this, the contact lens is secured to the ball, as shown in FIG. 4, and the concave surface of the lens is tested. Finally, the position of the lens is changed on the ball in accordance with FIG. 5 and the curvature of the convex surface of the lens is tested with the ophthalmometer or keratometer.

It is to be understood that the form herein described and illustrated represents only an example of my invention and that various modifications in the shape, size, and in the arrangement of parts may be resorted to, without departing from the spirit of my invention or the scope of the following claims.

I claim:

1. A contact lens holder, for use in conjunction with a curvature measuring instrument, comprising a clamping means for engaging said measuring instrument; a sleeve, mechanically connected to said clamping means, and having a circular edge at its free end; a permanent magnet secured within said sleeve adjacent to said circular edge; a ball of magnetic material having a circular cavity with non-reflecting surface, and having the remainder of its surface polished and light reflecting, said ball being held by said permanent magnet against the said circular edge of the sleeve permitting a sliding motion between the surface of said ball and the said circular edge of the sleeve enabling said ball to function as a gauge and also as a lens holder when measuring the concave and the convex surfaces of the lens.

2. A contact lens holder mounted on an ophthalmometer for measuring the curvatures of contact lenses, comprising a clamping means engaging said opththalmometer; a sleeve secured to said clamping means and having a circular edge at one end; a permanent magnet secured within said sleeve adjacent to said circular edge; a ball of magnetic material having a circular cavity with non light reflecting surface for carrying the lens to be measured, and having the remainder of the ball surface light reflecting, permitting the ball to serve as a gauge for the calibration of said ophthalmometer, said ball being held by the attraction of said magnet against said circular edge permitting the sliding motion of the ball on said circular edge of the sleeve when changing from one of said functions of the ball to the other function.

3. A contact lens holder mounted on a keratometer for measuring the curvatures of contact lenses, comprising a clamping means engaging said keratometers; a sleeve secured to said clamping means and having a circular edge at one end; a permanent magnet secured within said sleeve adjacent to said circular edge; a ball of magnetic material having a circular cavity with non light reflecting surface for carrying the lens to be measured, and having the remainder of the ball surface light reflecting, permitting the ball to serve as a gauge for the calibration of said keratometer, said ball being held by the attraction of said magnet against said circular edge permitting the sliding motion of the ball on said circular edge of the sleeve.

4. A contact lens holder for positioning a contact lens in a curvature measuring instrument, comprising a clamping means engaging said curvature measuring instrument; a magnet secured to said clamping means; a ball of magnetic material held by the attraction of said magnet, permitting the rotation of the ball without changing the position of its center, said ball having a circular cavity with non light reflecting surfaces for holding the lens during the measurement of its concave and convex surface and having the remainder of the ball surface light reflecting utilized as a gauge.

References Cited in the file of this patent

UNITED STATES PATENTS 512,381    Keyes  ---------------- Jan. 9, 1894

OTHER REFERENCES

Wesley and Jenssen: "Contact Lens Fitting Manual," seventh revision, published in 1957 by the Plastic Contact Lens Co., Chicago, Ill.; 32 pages, manual, pp. 6, 26, and 27 cited.